(12) United States Patent
Chinoy et al.

(10) Patent No.: US 6,771,969 B1
(45) Date of Patent: Aug. 3, 2004

(54) APPARATUS AND METHOD FOR TRACKING AND COMMUNICATING WITH A MOBILE RADIO UNIT

(75) Inventors: Sharon Chinoy, Melbourne, FL (US); Michael LeBlanc, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 692 days.

(21) Appl. No.: 09/610,839

(22) Filed: Jul. 6, 2000

(51) Int. Cl.[7] .......................... G08G 1/123; H04Q 7/20
(52) U.S. Cl. .......................... 455/456.1; 455/404.2; 455/414.1; 455/457; 340/988; 340/989; 340/990
(58) Field of Search .................. 455/456.1, 428, 455/457, 404.2, 414.1; 340/988, 989, 990; 342/357.1, 557; 701/207

(56) References Cited

U.S. PATENT DOCUMENTS

| | | | |
|---|---|---|---|
| 5,155,689 A | 10/1992 | Wortham | 364/460 |
| 5,243,530 A | 9/1993 | Stanifer et al. | 364/452 |
| 5,428,546 A | 6/1995 | Shah et al. | 364/449 |
| 5,519,760 A | 5/1996 | Borkowski et al. | 379/59 |
| 5,636,122 A | 6/1997 | Shah et al. | 364/449.1 |
| 5,663,720 A | 9/1997 | Weissman | 340/934 |
| 5,758,288 A | 5/1998 | Dunn et al. | 455/456 |
| 5,841,766 A | 11/1998 | Dent et al. | 370/321 |
| 5,898,680 A | 4/1999 | Johnstone et al. | 370/316 |
| 5,904,727 A | 5/1999 | Prabhakaran | 701/208 |
| 5,914,946 A | 6/1999 | Avidor et al. | 370/336 |
| 5,922,040 A * | 7/1999 | Prabhakaran | 701/117 |
| 5,977,913 A | 11/1999 | Christ | 342/465 |
| 5,987,011 A | 11/1999 | Toh | 370/331 |
| 6,331,825 B1 * | 12/2001 | Ladner et al. | 340/988 |
| 6,492,941 B1 * | 12/2002 | Beason et al. | 342/357.1 |
| 6,522,265 B1 * | 2/2003 | Hillman et al. | 340/988 |

* cited by examiner

Primary Examiner—Nay Maung
Assistant Examiner—Alan T. Gantt
(74) Attorney, Agent, or Firm—Allen, Dyer, Doppelt, Milbrath & Gilchrist, P.A.

(57) ABSTRACT

An apparatus and method of the present invention establishes a communication link with at least one mobile radio unit as a mobile target by determining the location of the at least one mobile radio unit and displaying on a computer display an object identifier corresponding to the mobile radio unit. A user selects the object identifier and in response to the user selection, establishes one of at least a data or voice communication link with the mobile radio unit. A plurality object identifier corresponding to mobile radio units as different mobile assets are displayed and the object identifier for a displayed mobile radio unit in question is user selected as a mobile target to establish one of at least a data or voice communication link with the mobile radio unit.

45 Claims, 4 Drawing Sheets

APPARATUS AND METHOD FOR TRACKING AND COMMUNICATING WITH A MOBILE RADIO UNIT

FIELD OF THE INVENTION

This invention relates to the field of communications and surveillance, and more particularly, this invention relates to the field of communicating with and tracking of a mobile target, such as a mobile radio unit.

BACKGROUND OF THE INVENTION

Current radio frequency radio control systems often require a centralized operator at a control operations center to communicate with a specific mobile target or plurality of mobile targets within a region by selecting a radio's frequency and site button to establish a communications link, i.e., communications channel, with a targeted mobile radio unit representing the mobile target in question. Different examples of mobile targets include an aircraft, ocean going vessel, train, vehicle or other mobile target that contains a mobile radio unit for communication. Thus, a centralized operator working at a control operations center is required to know the location of different radio sites in relation to the mobile target and used in communication links in order to establish voice or data communication with that mobile target. Most of the existing systems in use today do not provide integrated locating and communication, and do not provide increased operator performance and situation awareness.

Historically, control over radio communications was provided by radio control panels that were hard-wired to radios or a switch. These hardware systems evolved prior to the evolution of sophisticated software automation systems. When software solutions were designed for radio communication, they emulated the hardware button approach using software push buttons displayed on a screen forming a graphical user interface. These systems, however, still required the operator to know the frequency and site identifier, i.e., the physical location of a communication linked radio tower when attempting to talk with the mobile target, i.e., mobile radio unit. In addition, separate automation systems displayed location information of the target. For example, in an air traffic control situation, one monitor will be used to display the aircraft location. Another monitor will display information regarding radio control, e.g., the voice switching and control system (VSCS). In a sheriff's or other law enforcement officer's communication center, a typical radio dispatcher position would include a Computer Aided Dispatch (CAD) screen, a status screen, an electronic map, and a radio controller. These elements are not integrated as a whole.

Although there are presently many proposals for emergency 911 procedures where the location of a cellular is determined using GPS or triangulation, there are no integrated solutions for tracking and establishing communication links with one or more mobile targets.

U.S. Pat. Nos. 5,428,546; 5,636,122; and 5,904,727, assigned to Mobile Information Systems, Inc., disclose the use of a monitor that allows the location of a mobile unit to be displayed on the monitor as an icon. Jobs can be assigned to vehicles as part of a database within a computer system and coupled to a vector database. The dispatching system has job icons displayed on a rasterized map. However, there is no integrated solution of both localization information and communication control.

U.S. Pat. No. 5,987,011 to Toh discloses a routing method for supporting ad-hoc mobile communications within a radio communications network, where the stability of various communication links between neighboring mobile hosts are measured. A communications route through the network is selected and based on the stability of the communication links. Thus, the best routing method for a mobile network can be provided.

However, these and other similar proposals do not provide an integrated system having increased operator performance and situation awareness, which also allows the location determination of the mobile radio unit and the tracking of and communication with integrated unit.

SUMMARY OF THE INVENTION

The present invention is advantageous and allows for the establishment of a communication link with a mobile target, i.e., mobile radio unit, by determining first the location of the mobile radio unit, or a plurality of mobile radio units, such as by location determining sensors. The mobile radio unit is displayed on a user interface of a computer display as an object identifier. The user selects the object identifier and in response to the user selection, establishes one of at least a data or voice communication link with the mobile radio unit. Thus, it is possible to track various mobile radio targets, such as emergency vessels, helicopters and ships in distress, aircraft, land-based vehicles, and then establishing communciation by the user selecting an icon. The system automatically establishes the appropriate communications link based on pre-established criteria that may include least cost, strongest signal, least path congestion or other. This apparatus and system allow a completely integrated voice and data system.

In accordance with one aspect of the present invention, the apparatus includes a controller for receiving location determining signals from sensors and determining the location of a mobile unit. This determination could be based on the target's location information and mode of radio transmission, and the use of other sensors, as known to those skilled in the art. A computer display is associated with the controller for displaying the mobile radio unit as an object identifier and, in one aspect of the invention, displaying the geographic location. A transceiver is connected to the controller. Upon user selection of the object identifier, at least one of a data or a voice communication link is established with the mobile radio unit.

The object identifier displayed on the computer display can identify the geographic location of the mobile radio unit in latitude and longitude coordinates and altitude, if appropriate. The transceiver can also establish a least cost routing communications link with the mobile radio unit. This information on least cost routing can be contained in a least cost routing database. A database is also associated with the controller for storing data relating to the location or other information of a target containing the mobile radio unit. A unique object identification code is assigned to the mobile radio unit, including the location data stored within the database. This unique object identification code is linked to the displayed object identifier for allowing user selection of the object identifier, while selectively accessing the data stored within the database on the mobile radio unit.

Naturally, the transceiver can be part of the modem of a computer, interface card, or radio unit connected to the processor. A recorder can record any data or voice communications that are established to the mobile radio unit for future reference.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention is advantageous, allowing a determination of an appropriate mobile unit location using sensor data about radio location and mode of radio transmission or other means, and provides an integrated voice and data system.

Figure 1:
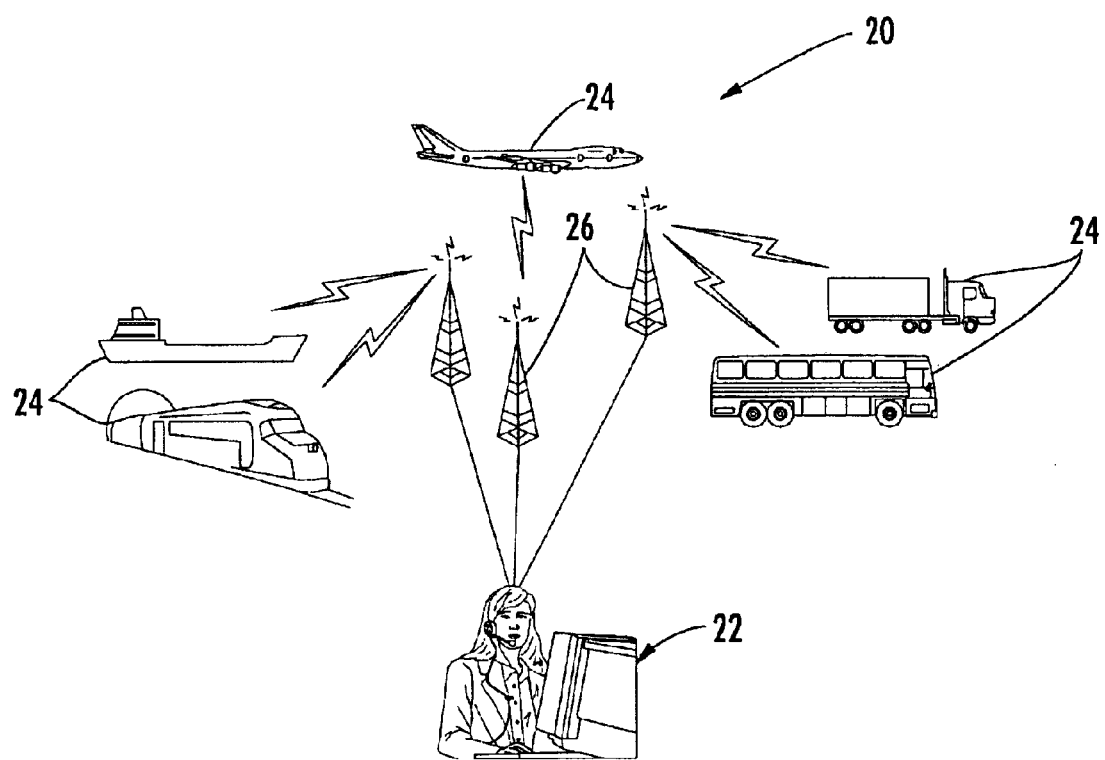
FIG. 1 is a general, overall view of the integrated system of the present invention showing communication between an operations control center and mobile targets, i.e., mobile radio units, via wireless radio transmission towers, such that integrated or separate sensors may be used to determine location.

As shown in FIG. 1, the system of the present invention is illustrated generally at 20, and includes an operations control center 22 that communicates with and tracks various mobile assets and targets corresponding to mobile radio units 24, such as transportation vehicles, i.e., the illustrated bus and tractor trailer, the jet aircraft as a commercial airline, or military or emergency management system (EMS) aircraft, a train and ship. Communication is accomplished via the communication links shown as wireless towers 26.

The present invention is especially applicable for use in rescue or surveillance operations, such as with the Coast Guard, police dispatch, air traffic control, fleet management, or other similar organizations, where various mobile radio units can be tracked (e.g., police cars, aircraft rescue ships, and fleet vehicles). Mobile radio units are also referred to as mobile assets when associated with an organization, group base, or administrative center. They are also mobile targets because targets are tracked or their location determined, and communication established with a target in question. A ship, aircraft vehicle, or other mobile target is a mobile radio unit and mobile target that is tracked. Information is updated in a database through appropriate processors that receive information about the particular mobile target, process it, and store it within a database.

Figure 2:
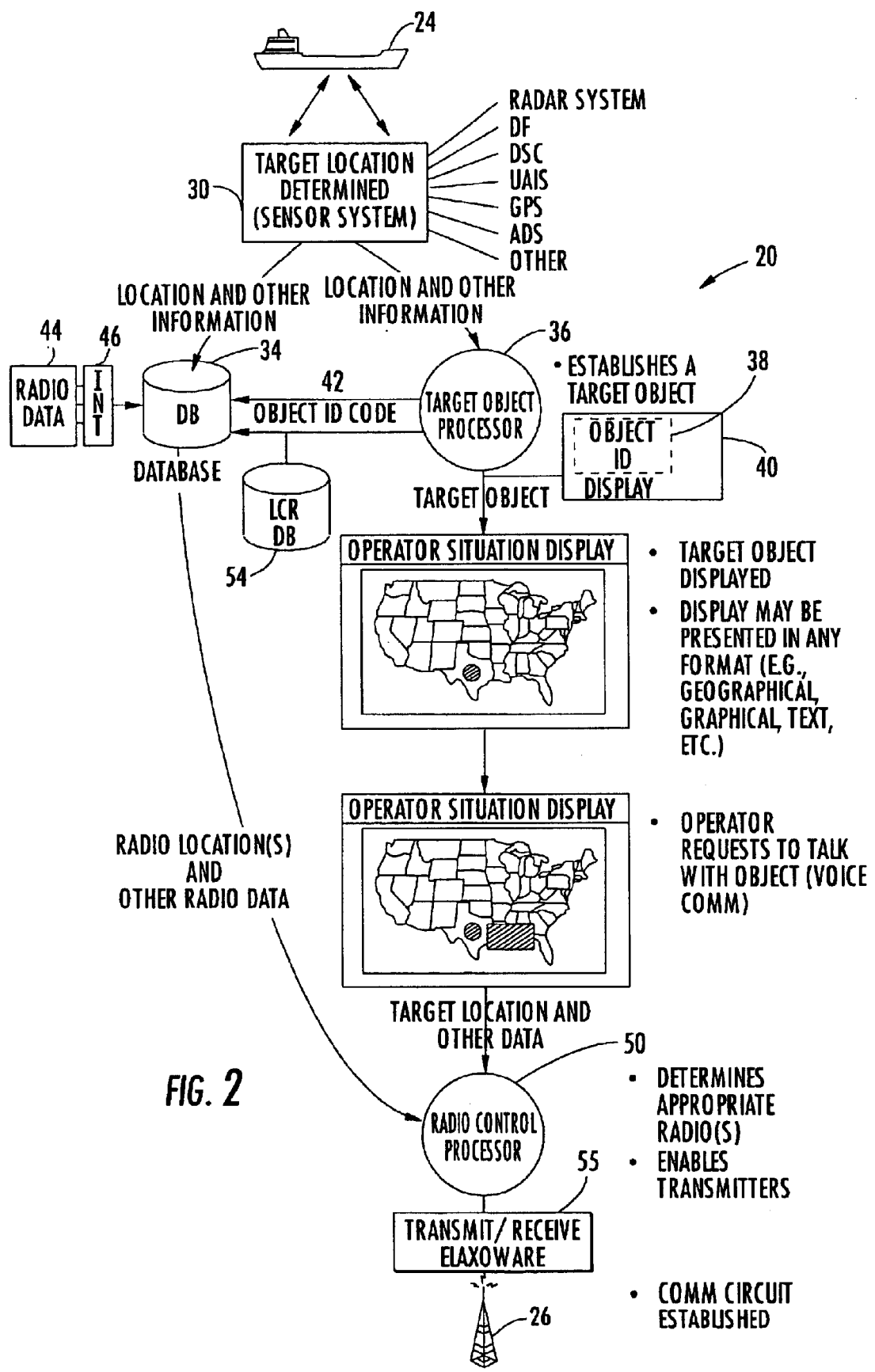
FIG. 2 is a schematic, block and pictorial diagram showing the process flow from the point when a mobile target location is established to the point when the communications link circuit is established with the mobile target.

As shown in FIG. 2, a sensor system is illustrated generally at block 30 and acquires location data about a mobile target, such as the illustrated mobile radio unit 24. The sensor system could be formed from a plurality of different sensors. These could include a radar system used for location determination, RDE, DSC, UAIS, GPS, ADS or other systems as known to those skilled in the art.

The location data and other information known about the mobile target or mobile radio unit is forwarded to a database 34 and a computer processor 36, also referred to as a target object processor, which establishes through appropriate software a target object for display on a computer screen, i.e., an object identifier 38 that is displayed on a computer screen of a display 40 associated with the computer processor. The processor has software that assigns a unique object identification code 42 to the mobile radio unit. The processor uses the code 42 for accessing from the database 34 any data about the mobile radio unit that is the selected mobile target, including any location data, identification data, and other data stored within the database about the mobile target. The object identifier 38 is in one aspect of the present invention displayed as a user selectable icon on a graphical user interface as explained below. It could also be user selectable text or other user selectable means.

Radio data 44 is also received in the database through an appropriate radio interface 46 that could include other location data, such as identifying data on the type of mobile target or mobile radio unit that would aid in rescue, determining capacity or work characteristics, or other information. After accessing the database, the processor 36 controls the computer display 40 to place on screen an operator situation display where the object identifier 38 is displayed on screen in almost any desired screen format, such as geographical, graphical, text or other display types known to those skilled in the art. Although a geographical display is shown, it should be understood that the exact geographical location of the mobile radio unit, i.e., the mobile target or other mobile asset, does not have to be known by the operator. The system has determined automatically the mobile target location and operates accordingly.

A user selects the object identifier 38, such by clicking a mouse button, and in response to the object identifier selection, establishes one of at least a data or voice communication link with the mobile radio unit. A radio control processor 50, which could be separate from, associated with, or the same as the target object processor 36, determines what radios or other communication transmitters are activated with transmit/receive hardware 55 to enable transmission and establish a communication link, i.e., circuit, with the targeted mobile radio unit. This step could include accessing a least cost routing database 54 to determine the least cost route to a mobile target in terms of data integrity or actual monetary value. For example, different communications networks could be used or a determination made that part of the communication link may include a land line connection and part can include a wireless network as part of the connection.

Both voice switching and air-ground communication could be used as explained. The system as disclosed allows for a VHF voice communication system (e.g., as used by the Coast Guard, 911 communication center, or air traffic controller) and permits centralized operators at an operations control center to locate a vessel and communicate with it, or communicate with any vessels within a desired region in an integrated fashion.

Figure 3:
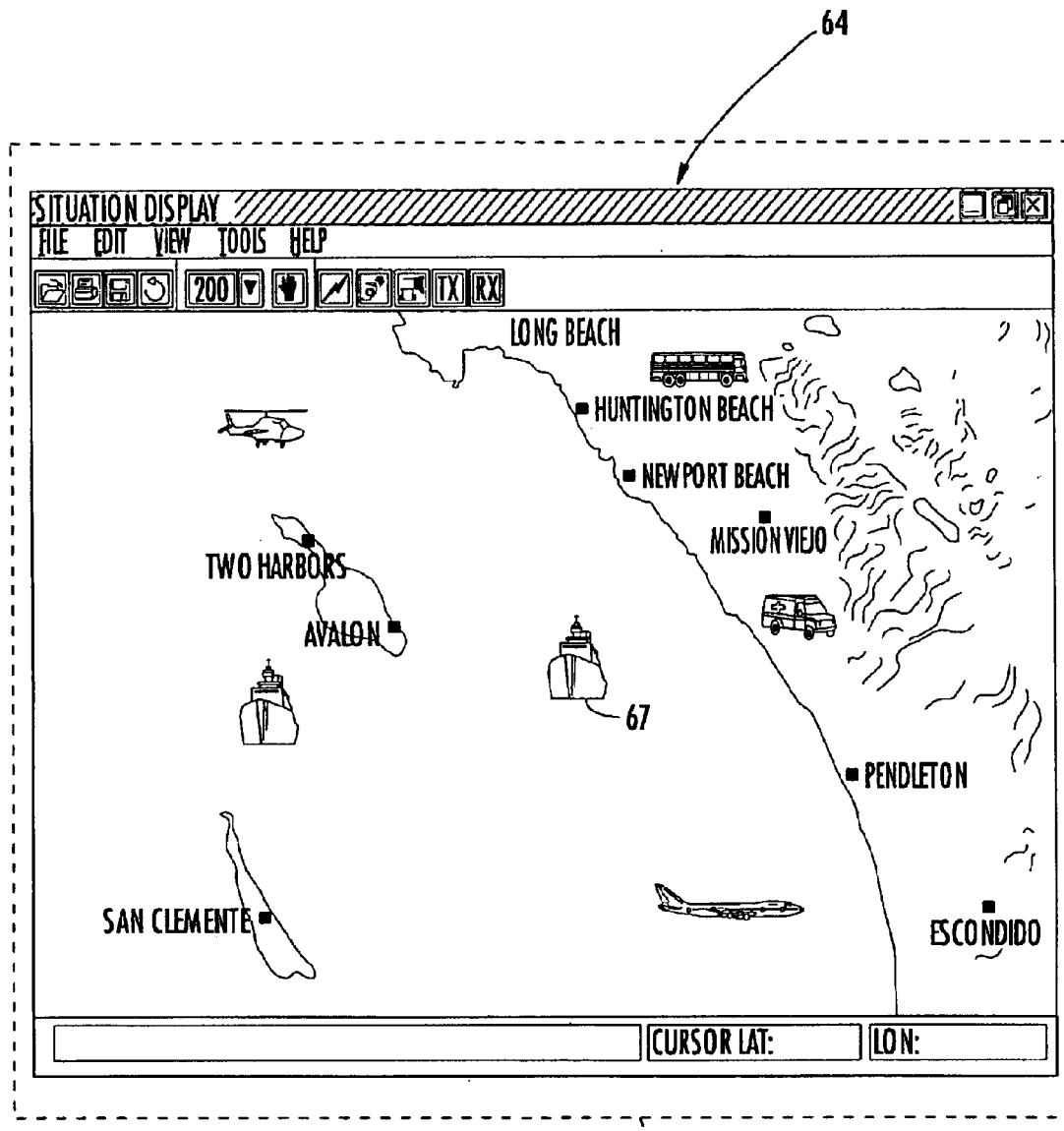
FIG. 3 is a computer screen representation showing a user interface that displays various mobile radio units as mobile targets and assets on a geographical display.

FIG. 3 illustrates an example of the type of graphical user interface 64 that can be displayed on a computer screen at a workstation terminal 62 or other location station. The interface is a general Windows™ format. Various mobile radio units corresponding to mobile assets are illustrated as a helicopter icon, and ship icon. Various cities are displayed on the geographic display and correspond to different facilities that have administrative centers for monitoring and/or controlling mobile assets, such as helicopters, ships, etc. A mobile target location to be determined is shown by the location of the target icon 67.

Figure 4:
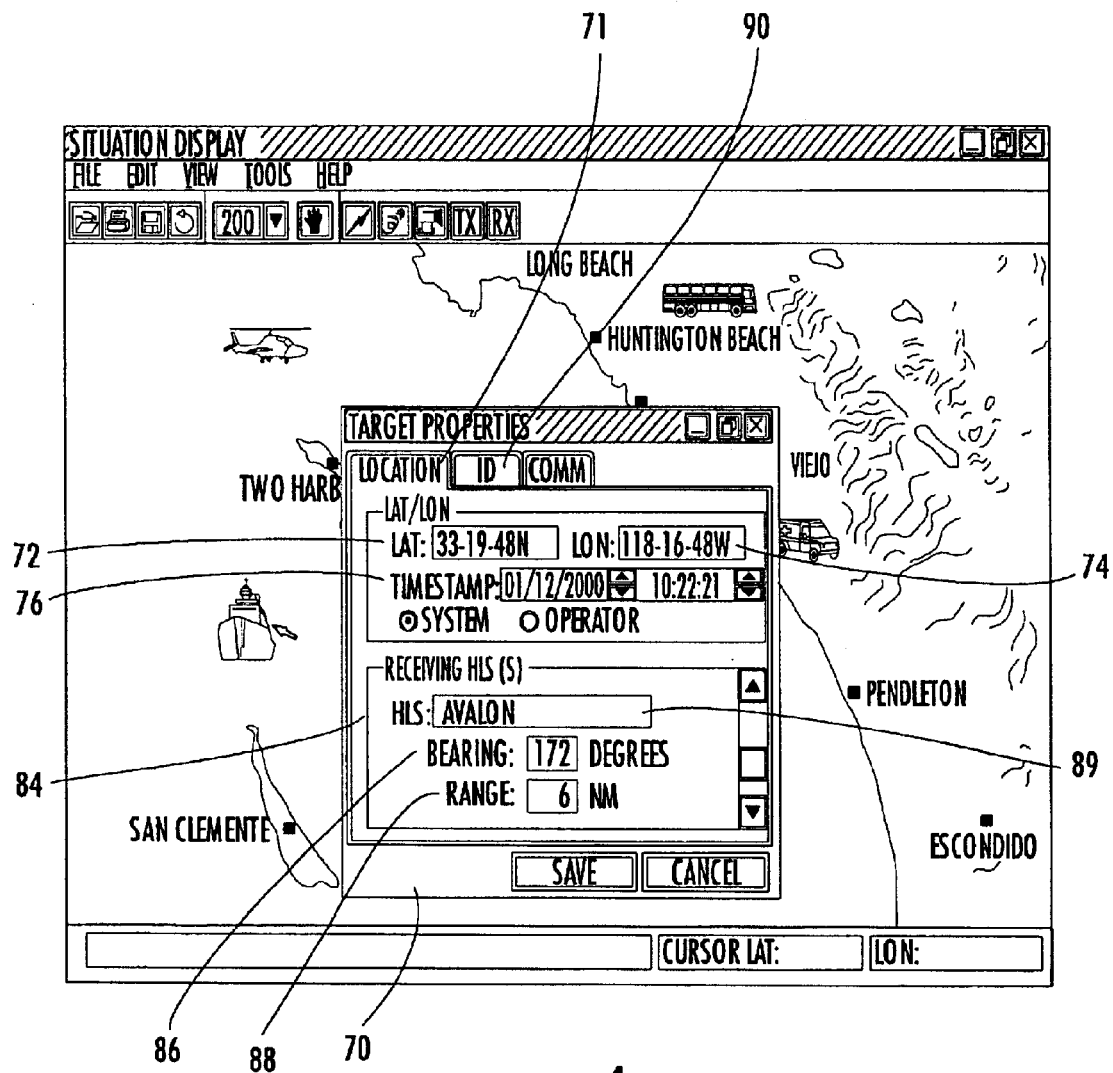
FIG. 4 shows a computer screen where the icon for a mobile target as a mobile radio unit has been selected and a target properties box has been displayed, indicating location.

FIG. 4 illustrates a computer screen similar to that shown in FIG. 4, where a mobile target is located by sensors, such as radar or RDF. The data is stored in the database and processed for display as an object identifier. The user clicks on the mobile target 67 and a target properties box 70 is displayed, which shows the latitude, longitude, time, and any other relevant information that is maintained in the database and is desired to be displayed. The system 20 of the present invention works with the controllers 36,50 and sensor system 30 to maintain tracking of the mobile target and other mobile radio units, which can be displayed as icons that periodically change position on the screen corresponding to movement. As shown on the target properties user box 70, the location data area 71 can include the respective latitude and longitude data entry lines 72,74, a time stamp 76, the receiving station data area 84, including information such as its bearing 86 and range 88, and the name area 89 of the unit. Other information could include an ID tab 90 that can be depressed to show the identification information of the target. This information can be modified as necessary and then stored in the database 34. For example, if greater information is found about the mobile target, this information can be stored and later used. It is possible to establish communication by dialing a telephone number automatically when a user clicks an icon.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A method of establishing a communication link with a mobile radio unit comprising the steps of:

determining the location of at least one mobile radio unit;

selecting a desired screen format for a computer display as either a geographical, graphical or text display;

displaying on the computer display an object identifier indicative of the mobile radio unit as either the geographical, graphical or text display as selected by the user; and user selecting the object identifier and in response to the user selection, establishing one of at least a data or voice least cost route communication link with the mobile radio unit.

2. A method according to claim 1, and further comprising the step of storing least cost routing data within a least cost routing database and accessing the database for determining a least cost route of the communication link.

3. A method according to claim 1, and further comprising the step of storing data relating to the location of the mobile radio unit within a database while also updating periodically within the database any changes reflective of a change in location of the mobile radio unit.

4. A method according to claim 1, and further comprising the step of assigning a unique identification code to the mobile radio unit for accessing from the database any data about the mobile radio unit, including location data of the mobile radio unit.

5. A method according to claim 1, and further comprising the step of displaying the geographic location of the mobile radio unit on the computer display in longitude and latitude coordinates.

6. A method of establishing a communication link with at least one mobile radio unit comprising the steps of:

determining the location of a mobile radio unit;

storing data relating to the location of the mobile radio unit within a database while also updating periodically within the database any changes to the data reflective of a change in location of the mobile radio unit;

assigning a unique object identification code to the mobile radio unit for accessing from the database any data about the mobile radio unit, including the location data stored within the database;

displaying on a computer display an object indentifier corresponding to the mobile radio unit, wherein the object identifier is linked to the unique object identification code for accessing from the database the stored data about the mobile radio unit and location data of the mobile radio unit;

user selecting an object identifier and displaying a target properties box having a display of stored data from the database that identifies specific data about the mobile radio unit as retrieved from the database to aid in determining specific applications for the mobile radio unit as a mobile asset; and selecting the object identifier through the user interface and in response to the object identifier selection, establishing one of at least a data or voice communication link with the mobile radio unit.

7. A method according to claim 6, and further comprising the step of displaying the object identifier as a user selectable icon on a graphical user interface.

8. A method according to claim 6, and further comprising the step of displaying the object identifier as user selectable text on a user interface.

9. A method according to claim 6, wherein the data about the mobile radio unit stored within the database further comprises information relating to communication parameters of the communication link that can be established with the mobile radio unit.

10. A method according to claim 6, and further comprising the step of displaying the geographic location of the mobile radio unit as an object identifier on the computer display in longitude and latitude coordinates.

11. A method according to claim 6, wherein the step of determining the location of the mobile radio unit further comprises the step of receiving a distress signal from the mobile radio unit.

12. A method according to claim 6, wherein the object identifier further comprises a geographic region displayed on a geographic display.

13. A method according to claim 6, and further comprising the step of dialing a telephone number to establish a communication link.

14. A method according to claim 6, and further comprising the step of recording any data or voice communications that are established to the mobile radio unit.

15. A method according to claim 6, and further comprising the step of determining the location of the mobile radio unit by the use of direction finding sensors.

16. A method of establishing a communication link with a mobile radio unit comprising the steps of:

determining the location of the mobile radio unit within a mobile network by the use of direction finding sensors;

storing data relating to the location of the mobile radio unit within a database while also updating periodically within the database any changes to the data reflective of a change in location of the mobile radio unit;

storing least cost routing data in a database for establishing a least cost networked communication link with the mobile radio unit from a controller;

assigning a unique object identification code to the mobile radio unit for accessing from the database the data about the mobile radio unit, including the location data stored within the database;

displaying on a computer display an object indentifier corresponding to the mobile radio unit, wherein said object identifier is linked to the unique object identification code for accessing from the database the stored data about the mobile radio unit and location data of the mobile radio unit;

user selecting the object identifier through the user interface and in response to the object identifier selection, determining a least cost communication route to the mobile radio unit; and establishing one of at least a data or voice networked communication link with the mobile radio unit based on the least cost communication route determination.

17. A method according to claim 16, wherein said least cost communication route is determined by accessing the least cost routing database containing costs of communication routes between the user selected mobile radio unit and controller, and calculating a least cost route.

18. A method according to claim 17, and wherein the step of establishing one of at least a data or voice networked communication link comprises the step of merging a plurality of controller to target communication routes into a least cost communication route.

19. A method according to claim 16, and further comprising the step of updating the least cost routing database at predetermined time intervals.

20. A method according to claim 6, and further comprising the step of displaying the object identifier as a user selectable icon on a graphical user interface.

21. A method according to claim 16, and further comprising the step of displaying the object identifier as user selectable text on a user interface.

22. A method according to claim 16, and further comprising the step of displaying the geographic location of the mobile radio unit s an object identifier on the computer display in latitude and longitude coordinates.

23. A method according to claim 16, wherein the data about the mobile radio unit stored within the database further comprises information relating to communication parameters of the communication link that can be established with the mobile radio unit.

24. A method according to claim 16, wherein the step of determining the location of the mobile radio unit further comprises the step of receiving a distress signal from the mobile radio unit.

25. A method according to claim 16, wherein the object identifier further comprises a geographic region displayed on a geographic display.

26. A method according to claim 16, and further comprising the step of dialing a telephone number to establish a communication link.

27. A method according to claim 16, and further comprising the step of recording any data or voice communications that are established to the mobile radio unit.

28. A method according to claim 16, and further comprising the step of determining the location of the mobile radio unit by the use of direction finding sensors.

29. An apparatus for establishing a communication link with a mobile radio unit comprising:

a controller for receiving location determining signals and determining the location of a mobile radio unit;

a computer display associated with the controller for displaying an object identifier indicative of the mobile radio unit, wherein said controller is operative for displaying a desired screen format of either a geographical, graphical or text display based on a user selection of the desired display; and a transceiver connected to the controller, wherein upon user selection of the object identifier, at least one of a data or a voice least cost route communication link is established with the mobile radio unit.

30. An apparatus according to claim 29, wherein said object identifier displayed on said computer display identifies the geographic location of the mobile radio unit in latitude and longitude coordinates.

31. An apparatus according to claim 29, and further comprising a least cost routing database for storing least cost routing data.

32. An apparatus according to claim 29, and further comprising a database associated with said controller for storing data relating to the location of the mobile radio unit, and a unique object identification code assigned to the mobile radio unit, including the location data stored within the database.

33. An apparatus according to claim 32, wherein said unique object identification code is linked to said object identifier for allowing user selection of the object identifier and selectively accessing the data stored within the database about the mobile radio unit.

34. An apparatus for tracking and communicating with a mobile radio unit comprising:

a controller for receiving location determining signals and determining the location of a mobile radio unit;

a database connected to the controller for storing data relating to the mobile radio unit, including the location of the mobile radio unit, said controller assigning a unique object identification code to the mobile radio unit for accessing by the controller the database and retrieving any stored data about the mobile radio unit;

a computer display associated with the controller for displaying an object identifier corresponding to the mobile radio unit, wherein said object identifier is linked to the unique object identification code, wherein said object identifier can be user selected to display stored data in a target properties box that identifies specific data about the mobile radio unit as retrieved from the database to aid in determining specific applications for the mobile radio unit as a mobile asset; and a transceiver connected to the controller, wherein upon user selection of the object identifier, at least one of a data or a voice communication link is established with the mobile radio unit.

35. An apparatus according to claim 34, wherein said object identifier is displayed as a user selectable icon on a graphical user interface.

36. An apparatus according to claim 34, wherein said object identifier is displayed as user selectable text.

37. An apparatus according to claim 34, wherein the data about the mobile radio unit stored within the database further comprises information relating to communication parameters of the communications link that can be established with the mobile radio unit.

38. An apparatus according to claim 34, wherein said object identifier further comprises a geographic region displayed on said computer display.

39. An apparatus according to claim 34, and further comprising a recorder for recording any data or voice communications that are established to the mobile radio unit.

40. An apparatus for tracking and communicating with a mobile radio unit comprising:

a controller for receiving location determining signals and determining the location of a mobile radio unit;

a database connected to the controller for storing data relating to the mobile radio unit, including the location of the mobile radio unit, said controller assigning a unique object identification code to the mobile radio unit for accessing by the controller the database and retrieving any stored data about the mobile radio unit;

a least cost routing database connected to the controller for storing least cost routing data for establishing a least cost networked communication link with the mobile radio unit;

a computer display associated with the controller for displaying an object identifier corresponding to the mobile radio unit, wherein said object identifier is linked to the unique object identification code; and a transceiver connected to the controller, wherein upon user selection of the object identifier, at least one of a data or a voice communication link is established with the mobile radio unit.

41. An apparatus according to claim 40, wherein said object identifier is displayed as a user selectable icon on a graphical user interface.

42. An apparatus according to claim 40, wherein said object identifier is displayed as user selectable text.

43. An apparatus according to claim 40, wherein the data about the mobile radio unit stored within the database further comprises information relating to communication parameters of the communications link that can be established with the mobile radio unit.

44. An apparatus according to claim 40, wherein said object identifier further comprises a geographic region displayed on said computer display.

45. An apparatus according to claim 40, and further comprising a recorder for recording any data or voice communications that are established to the mobile radio unit.

* * * * *